United States Patent [19]

Mearns et al.

[11] 4,078,777
[45] Mar. 14, 1978

[54] WATER-AIR SEAL FOR CONVERTER HOOD

[75] Inventors: Alexander Mearns, McCandless Township, Allegheny County; Lido Michael Dreucci, Castle Shannon Boro, Allegheny County, both of Pa.

[73] Assignee: United States Steel Corporation, Pittsburgh, Pa.

[21] Appl. No.: 767,180

[22] Filed: Feb. 9, 1977

[51] Int. Cl.² .............................................. C21C 5/40
[52] U.S. Cl. .................................................. 266/158
[58] Field of Search ........................ 122/7 A; 75/60; 266/142, 143, 158

[56] References Cited

U.S. PATENT DOCUMENTS 3,814,402  6/1974  Maubon .............................. 266/158

Primary Examiner—Gerald A. Dost
Attorney, Agent, or Firm—John F. Carney

[57] ABSTRACT

A seal is provided to prevent gas flow through the opening in the converter enclosure that accommodates the converted hood and the annular skirt that is telescopically movable thereon. The seal comprises a fixed ring on the enclosure and a movable ring attached to the skirt. The latter contains a liquid body for sealing purposes. The configuration of the rings is such that they cooperate to define a labyrinth to prevent kish accumulation in the liquid seal. Pressurized air can be supplied to augment the liquid seal.

20 Claims, 6 Drawing Figures

WATER-AIR SEAL FOR CONVERTER HOOD

BACKGROUND

When, during the blowing period of a steel refining process, oxygen is introduced into a steelmaking converter, of either the top- or bottom-blown type, large quantities of gaseous effluent are generated by the chemical reaction between the oxygen and the high temperature molten metal in the converter. The effluent is discharged from the mouth of the converter into a gas collecting hood which conducts the same to gas cleaning apparatus for appropriate processing prior to its being discharged to the atmosphere. Gas-collecting hoods of the type involved are customarily provided with a sliding skirt that is telescopically mounted on the end of the hood adjacent the converter mouth and vertically movable with respect to the hood end from a lower position in which the skirt abuts the converter to seal the junction between the converter and the hood and a raised position whereby air for combustion from the effluent gas can be admitted to the hood interior.

Part of the gas containment structure of a converter installation of the described type includes a vessel enclosure through the upper wall of which the hood must extend in order to establish gas communication between the converter and the hood interior. In the past, the opening provided in the enclosure for penetration of the hood had to provide sufficient clearance in order to accommodate the movable skirt and the mechanism for operating the same. Although this clearance space was maintained as small as possible, it nonetheless provided ample opportunity for egress of the effluent gases from the converter especially during periods of high reaction activity thus permitting unacceptably large amounts of gas to leak from the system into the surrounding atmosphere.

It is to the improvement of such gas containment apparatus therefore that the present invention is directed.

SUMMARY

According to the present invention, there is provided apparatus including an apertured vessel within which gases are generated, gas confining means having an opening spaced above the vessel aperture, an annular skirt concentrically spaced from the edge of said opening and movable therewithin, and means for sealing the concentric space between said skirt and said edge, comprising a first annular body disposed in fixed relation to the edge of said opening and including plate means cooperating to define a pair of concentric spaces within said body, the ends of the spaces adjacent said converter aperture being open and those remote therefrom being closed, a second annular body movable with respect to said first body including concentrically spaced plates defining a receptacle extending into said spaces in said first body means for supplying liquid to said receptacle, and means for moving said second body in relation to said first body coincident with movement of said skirt.

It is accordingly a principal object of the present invention to provide apparatus for preventing the discharge of gaseous effluent from a oxygen steelmaking converter installation into the atmosphere.

It is another object of the invention to provide means for effectively sealing against deleterious effluent gas leakage the clearance space between the gas enclosure opening and the hood required to accommodate movement of the hood skirt between its lowered and raised positions.

Yet another object of the invention is to provide an effluent gas seal between the movable skirt and the gas enclosure that can accommodate movement of the skirt while maintaining the integrity of the seal.

Still another object of the invention is to provide an effluent gas seal of the described type in which the liquid seal can be supplemented by the injection of air under pressure.

For a better understanding of the invention, its operating advantages and the specific objectives obtained by its use, reference should be made to the accompanying drawings and description which relate to a preferred embodiment thereof.

BRIEF DESCRIPTION OF THE DRAWINGS

FIG. 1 is an elevational section of a steelmaking converter organization incorporating the seal apparatus of the present invention;

DESCRIPTION OF PREFERRED EMBODIMENT

Figure 1:
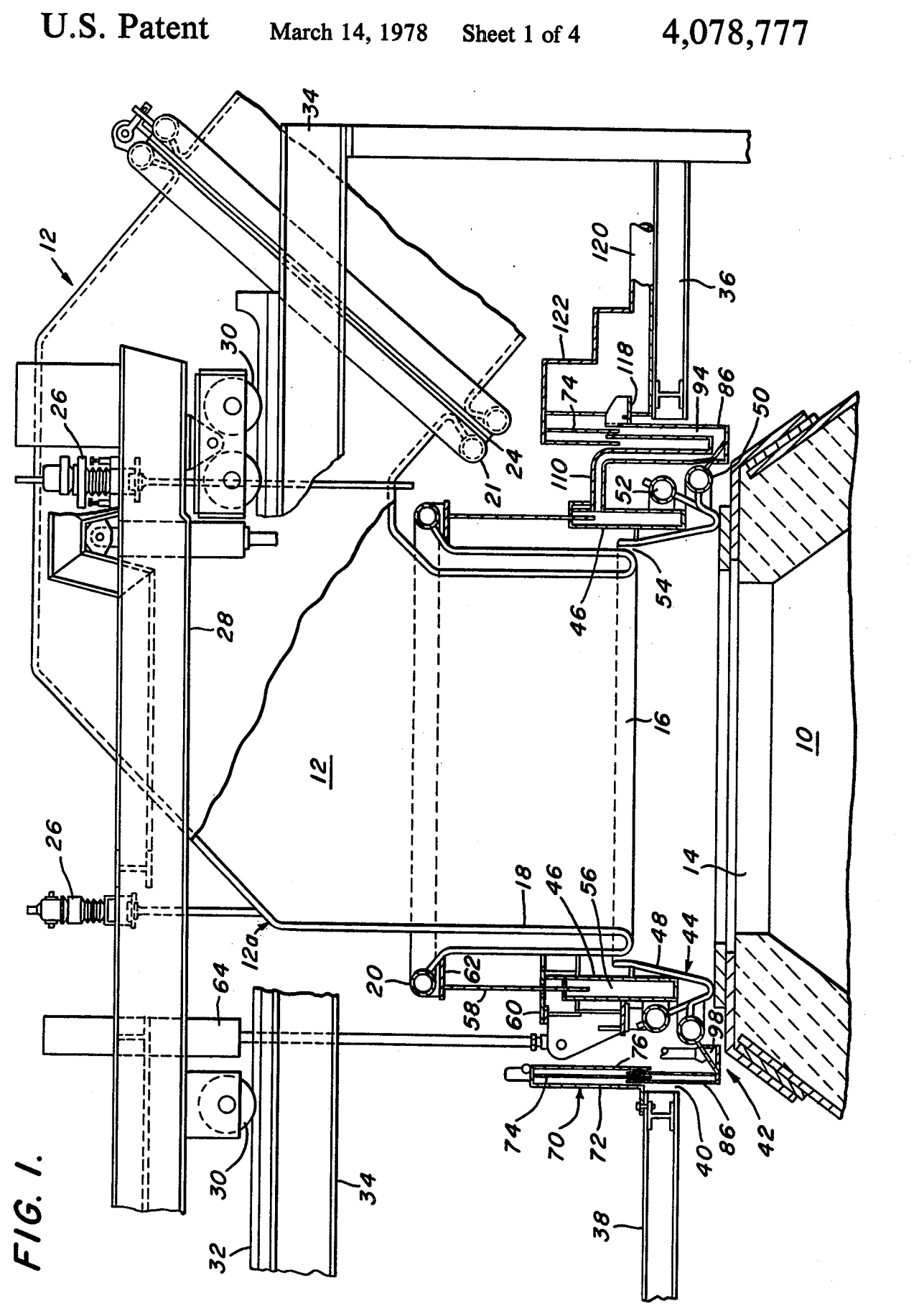
Figure 2:
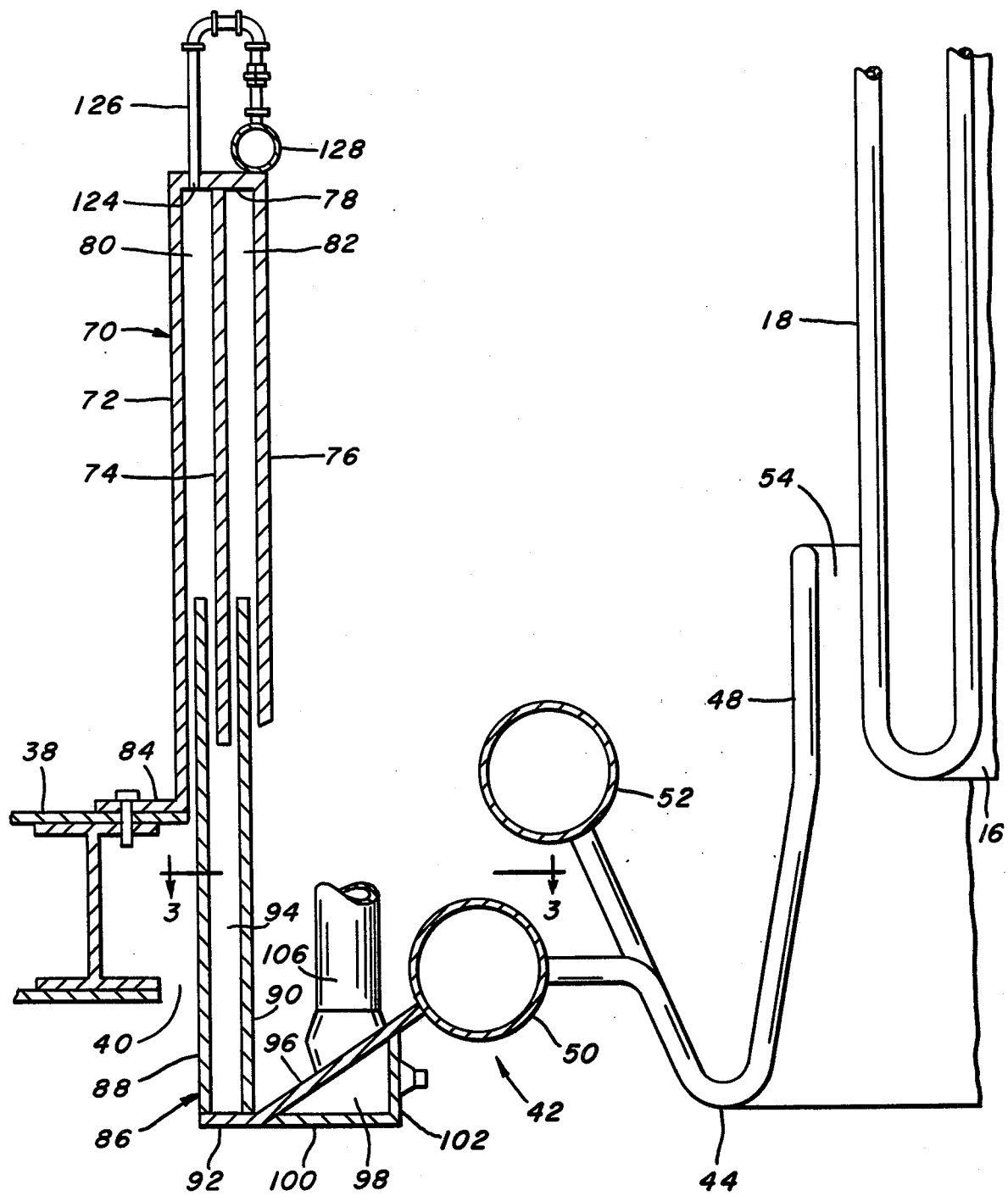
FIG. 2 is an enlarged sectional view of that part of the seal apparatus of the invention appearing at the left hand side of FIG. 1.
Figure 3:
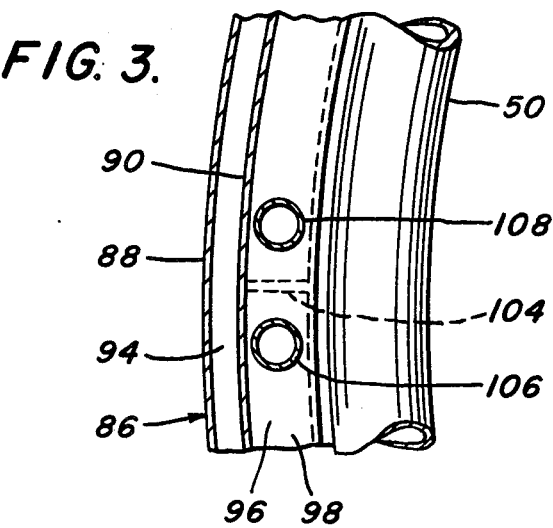
FIG. 3 is a sectional view taken along line 3—3 of FIG. 2.

In FIG. 1 of the drawing, there is illustrated a steel refining organization including a converter vessel 10 in which molten metal is refined by the injection of oxygen and other refining elements and a hood 12 arranged to conduct the gases generated in the vessel during the refining process to a point of ultimate discharge, all as is well known in the art. Also well known is the fact that certain gas-processing steps, such as complete or partial combustion of the gases as hereinafter described, are generally conducted in the hood 12 prior to discharge of the gases to the atmosphere.

The converter vessel 10, only the upper portion of which is shown in the drawing figure, is here illustrated as being of the type in which bottom-blown steelmaking processes are performed, although it should be understood that the invention described herein is equally applicable to organizations in which top blowing of oxygen occurs. The vessel 10 is provided with an upwardly facing mouth 14 through which gases generated within the vessel interior exit therefrom. Located above the vessel mount 14, in gas-receiving relation thereto, is the inlet opening 16 to the hood 12. The hood 12 is defined by polygonally arranged walls formed of parallel tubes 18 connected for the through flow of cooling liquid by inlet and outlet ring headers 20 and 21, respectively. The hood 12 is severable at a joint, indicating at 24, to enable the section 12a that overlies the vessel 10 to be laterally removed to permit workman access to the vessel interior. For this reason, the hood section 12a is fixedly suspended by elastic suspension means 26 from a carriage 28 having wheels 30 running on rails 32 carried by structural members 34.

The converter vessel 10 is enclosed within a housing 36, the top wall 38 of which is disposed at about the level of the space between the vessel mouth 14 and the lower end of the hood 12. The wall 38 of housing 36 is provided with a through opening 40 to accommodate the hood 12 and the skirt assembly 42.

Within the peripheral edge of opening 40 and surrounding the space between the vessel mouth 14 and the hood inlet opening 16 is an annular vertically movable skirt assembly 42 consisting of skirt 44 and a liquid seal structure 46, the details of neither of which form part of the present invention. The skirt 44 is defined by a plurality of hairpin tubes 48 that are disposed in parallel, side-by-side relation and whose opposite ends are connected between headers 50 and 52 for the circulation of coolant fluid therethrough. The skirt 44 is concentrically spaced at 54 from the exterior of the hood 12 to accommodate relative vertical movement between the two members. The seal structure 46 comprises an annular trough 56 containing a body of liquid and a baffle plate 58, the lower end of which is immersed in the liquid body to effect a seal and thereby prevent gas leakage through the space 54. Trough 56 is fixed to the skirt 44 by an annular support structure 60 which spacedly encircles the hood 12. Baffle plate 58, on the other hand, is stationary and depends from an annular seal plate 62 that is attached to inlet supply header 20 about one edge and to the exterior wall of the hood 12. The described seal structure is effective to accommodate vertical movement of the skirt assembly 42 while maintaining the integrity of the gas seal about space 54.

The skirt assembly 42 is vertically movable by means of hydraulically operated lifters 64, only one of a plurality of which is shown, between a lower position in which the bottom of skirt 44 abuts the top edge of vessel 10 about its mouth 14 and a raised position that permits entry of air from within the interior of housing 36 into the hood 12 where the same is employed for the complete or partial combustion of the combustible components of the effluent gases, such as carbon monoxide. Regulation of the influx of air into the hood is achieved by adjusting the position of the skirt 44 through operation of the lifters 64, all as is well known in the art.

According to the present invention, means are provided to positively seal the opening 40 in the converter housing 36 against the leakage of effluent gases while, at the same time, accommodating vertical movement of the skirt assembly 42. The sealing arrangement comprises a fixed ring 70 formed as an annular body having three concentrically spaced plates 72, 74 and 76 that are joined at their upper ends by annular end closure 78. The plates 72, 74 and 76 cooperate to define a pair of downwardly open concentric spaces, 80 and 82 respectively. The fixed ring 70 is detachably secured to the top wall 38 of housing 36 about the opening 40 by means of threaded connectors (not shown), or the like, that pass through aligned openings in the housing and in an annular flange 84 which extends outwardly from the exterior surface of the radially outermost plate 72.

Cooperating with the fixed ring 70 is a movable ring 86 formed as an annular body having two plates 88 and 90 that are upstanding from an annular bottom closure 92. Plates 88 and 90 are concentrically spaced with respect to each other to define a liquid receptacle 94 therebetween. The annular plates 72, 74 and 76 on fixed ring 70 and plates 88 and 90 on movable ring 86 are each formed of diameters to permit plates 88 and 90 on the movable ring to extend into the spaces 80 and 82 in the fixed ring and for the intermediate plate 74 on the fixed ring to be received in the receptacle 94 in the movable ring. This cooperation between the plates on the two rings permits relative telescopic movement between the two members. This configuration also produces labyrinth-like passages on opposite sides of the liquid receptacle 94 that impedes the incursion of kish or other fine particulate matter into the receptacle that would ultimately result in sufficient particle accumulation therein to cause failure of the seal.

The movable ring 86 is fixedly attached, as by means of welding, to the inlet supply header 50 of skirt 44 so as to effect movement of the ring with the skirt. Attachment of the ring 86 to header 50 is effected by welding the inner peripheral edge of a flange 96 that extends from the bottom closure 92 to the header.

Figure 5:
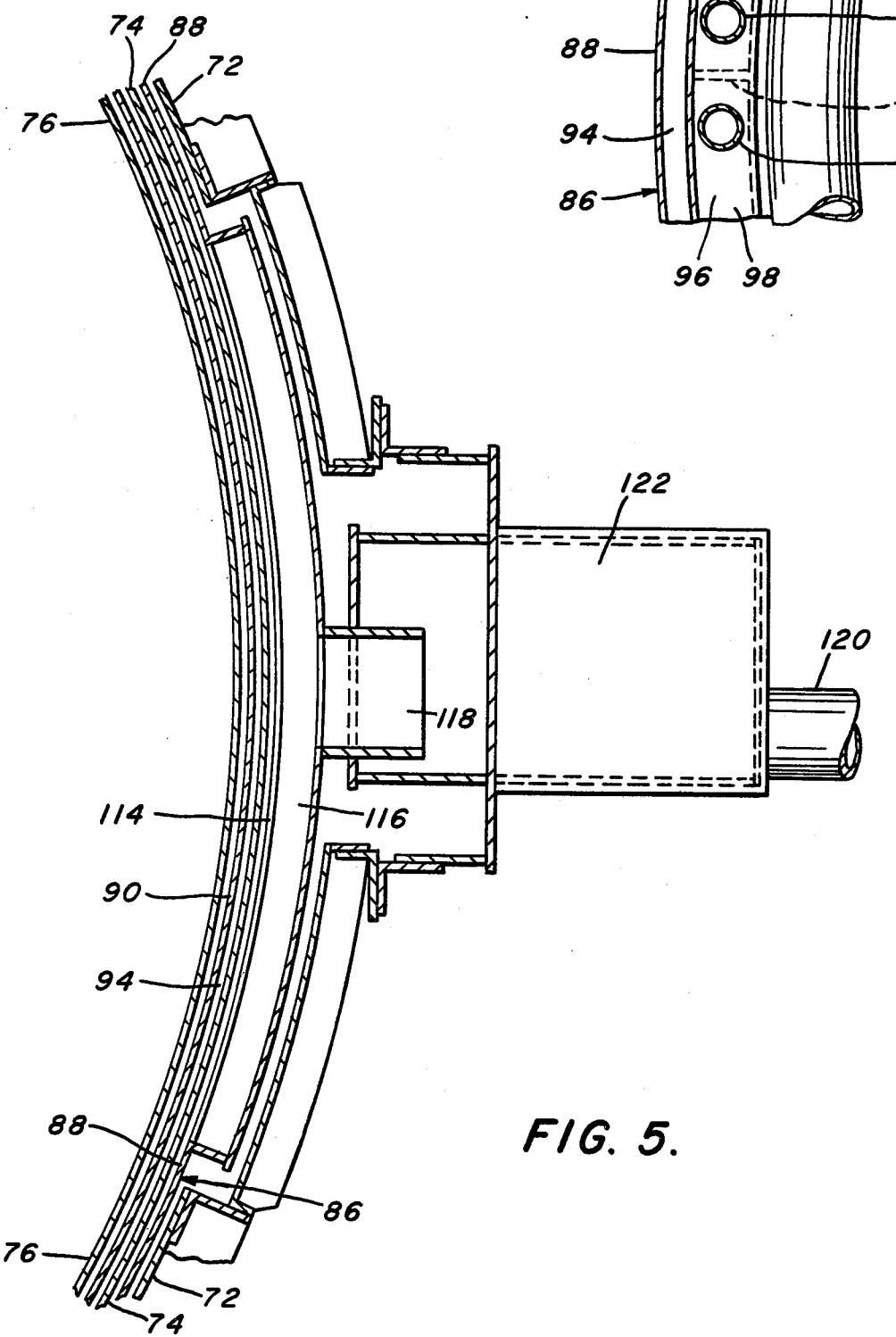
FIG. 5 is a sectional view taken along line 5—5 of FIG. 4.
Figure 4:
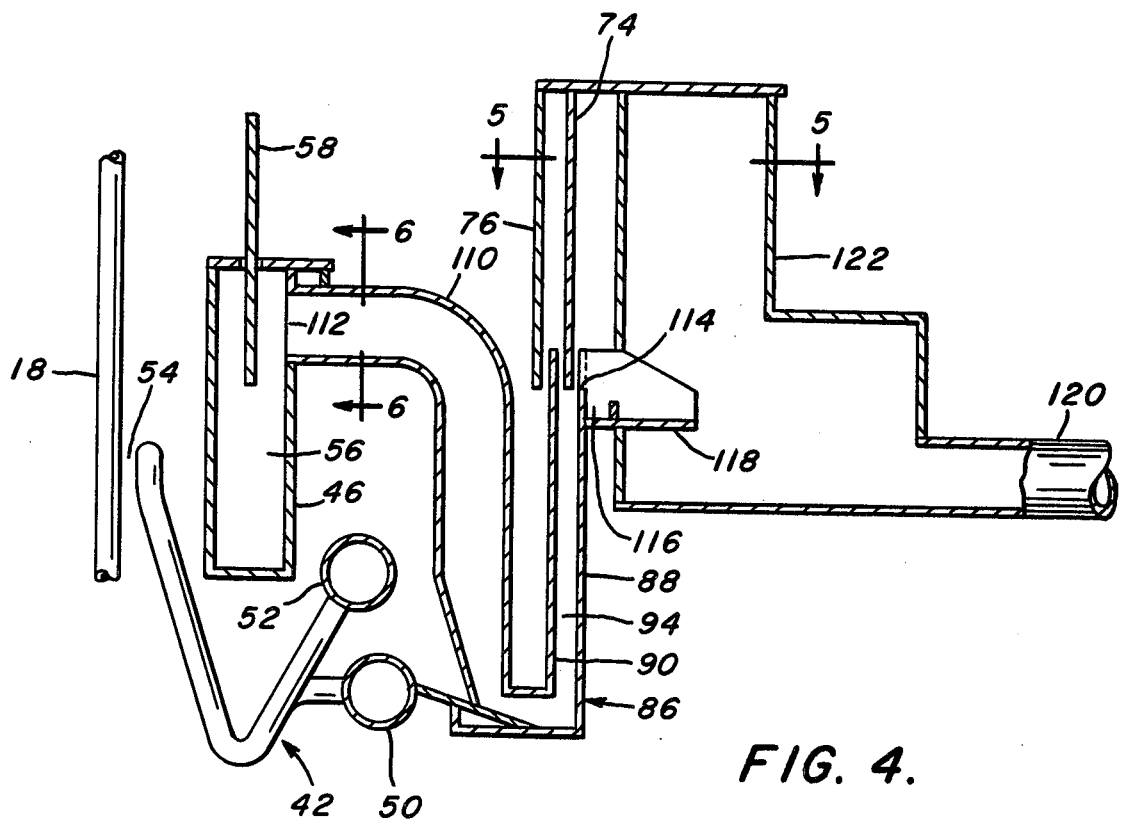
FIG. 4 is an enlarged sectional view of that part of the seal apparatus appearing at the right hand side of FIG. 1.

The lower end of the movable ring 70 that faces the converter mouth 14 and is thus exposed to radiant and convective heat from the converter is cooled by cooling liquid circulated in heat transfer relation to the ring bottom through an annular chamber 98 formed coincident with the bottom by subtending plates 100 and 102. To effect circulation of cooling fluid through the chamber 98, the chamber, as shown in FIG. 5, is provided at one point about its circumference with a closure partition 104. Cooling fluid inlet and outlet supply tubes 106 and 108 respectively, that connect to a source (not shown) of cooling liquid, communicate with the chamber each on opposite sides of, and in close relation to, the partition 104 whereby cooling fluid is caused to flow about the annular passage from the inlet to the outlet.

Figure 6:
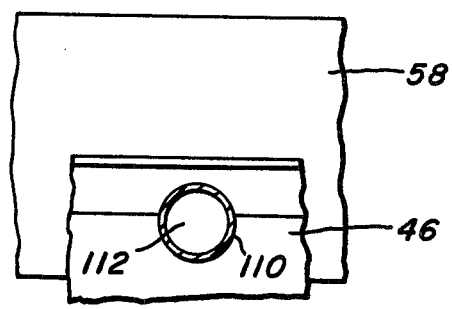
FIG. 6 is a sectional view taken along line 6—6 of FIG. 4.

In the preferred embodiment of the invention, it is contemplated to supply seal liquid to the receptacle 94 in fixed ring 86 by connecting the same in fluid circulation with the trough 56 forming part of the skirt assembly 42. The means for accomplishing this are best shown in FIGS. 5 through 6 and comprise a transfer duct 110 connected between and movable with the trough 56 and the receptacle 94 in the movable ring 86. The duct 110 communicates at its upper end with trough 56 through an opening 112 provided in the exterior side wall thereof. The lower end of the duct 110 communicates with the bottom of the receptacle 94 by penetrating the plate 90. Because the opening 112 in trough 56 is above the upper edge of the receptacle 94 the latter will remain filled to a level that will maintain immersion of the intermediate plate 74 of fixed ring 70. The liquid exits the receptacle 94 over a wier edge 114 formed on the upper edge of the plate 88 into an arcuate receiving tray 116 sized to accommodate the liquid flow from the receptacle. A discharge lip 118 is provided on the exterior side wall of tray 116 for discharge of liquid to a drain 120. The space between the drain 120 and the receiving tray 116 is sealed against gas leakage by plate means forming an enclosure 122.

The present invention contemplates supplementing the sealing effect of the liquid seal about the opening 40 in the converter enclosure 36 by the imposition of regulated amounts of seal air from a source of pressurized air (not shown). Thus, the end closure 78 of the fixed ring 70 is provided with a plurality of circumferentially spaced openings 124 that communicate with the space 80 between the plates 72 and 74. Connected to each opening 124 is a feeder line 126 connecting with an air manifold 128. As a result, pressurized air at a head preferably not less than 2 inches of water can be admitted to the seal to augment the effect of the liquid seal. Alternatively, in the event of complete loss of sealing liquid, air at this pressure or at a somewhat elevated level is deemed to be sufficient to provide an adequate pressure seal against gas leakage.

The described air admission means further provides a convenient device for introducing supplementary air for combustion to the interior of the hood enclosure 36 for induction into the hood during periods within which adequate amounts of air are not available in the enclosure to achieve the desired degree of effluent gas combustion in the hood. Air admitted to the space 80 in the fixed ring 70 will pass through the annular space between plate 72 in the fixed ring 70 and plate 88 in the movable ring 86 into the interior of the enclosure 36 from whence it can be induced into the hood 12 for use as combustion air.

Another ancillary advantage derived from use of the described seal arrangement is the facility with which exposure of the vessel mouth 14 can be obtained, as for example, when it is desired to rebrick the vessel lining or perform other maintenance tasks. To dismantle and remove the seal structure all that is required is to disengage the threaded connectors that connect the fixed ring flange 84 to the housing top wall 38 and to thereafter raise the skirt assembly 42 by operating lefters 64 to a level whereby the upper edges of plates 88 and 90 engage the end closure 78 to raise the fixed ring off its mounting. Thereafter, the fixed ring 70 can be transported with hood section 12a from the opening 30 by operation of the carriage 28.

It will be understood that various changes in the details, materials and arrangements of parts which have been herein described and illustrated in order to explain the nature of the invention, may be made by those skilled in the art within the principle and scope of the invention as expressed in the appended claims.

What is claimed is:

1. Apparatus including an apertured vessel within which gases are generated, gas confining means having an opening spaced above the vessel aperature, an annular skirt concentrically spaced from the edge of said opening and movable therewithin, and means for sealing the concentric space between said skirt and said edge, comprising:
   (a) a first annular body disposed in fixed relation to the edge of said opening and including plate means cooperating to define a pair of concentric spaces within said body, the ends of the spaces adjacent said converter aperture being open and those remote therefrom being closed;
   (b) a second annular body movable with respect to said first body including concentricaly spaced plates defining a receptacle extending into said spaces in said first body;
   (c) means for supplying liquid to said receptacle; and
   (d) means for moving said second body in relation to said first body coincident with movement of said skirt.

2. Apparatus as recited in claim 1 in which said second body is moved by said skirt.

3. Apparatus as recited in claim 2 in which said second body is fixedly attached to said skirt and movable therewith.

4. Apparatus as recited in claim 1 including means for introducing air under pressure to said concentric spaces in said first body.

5. Apparatus as recited in claim 4 in which one of said concentric spaces communicates with the interior of said gas confining means and in which said air under pressure is supplied to said concentric space.

6. Apparatus as recited in claim 1 including means for fluid cooling said second body.

7. Apparatus as recited in claim 6 in which said fluid cooling means comprises:
   (a) means forming an annular plenum on the end of said body adjacent said converter aperture; and
   (b) means for circulating cooling fluid through said plenum.

8. Apparatus as recited in claim 7 including:
   (a) a partition plate in said plenum;
   (b) cooling fluid supply means communicating with said plenum on one side of said partition plate; and
   (c) cooling fluid discharge means communicating with said plenum on the other side of said partition plate.

9. Appartus as recited in claim 1 in which said first body comprises three concentrically spaced plates cooperating to define a pair of concentric spaces therebetween and said second body comprises two concentrically spaced plates each extending into one of said concentric spaces of said first body.

10. Effluent gas leakage preventing apparatus for an oxygen steelmaking installation comprising:
    (a) a converter vessel having an aperture in the upper end thereof;
    (b) a gas confining enclosure surrounding said vessel and having an opening in the upper surface thereof in substantial axial alignment with said vessel aperture;
    (c) a gas collecting hood having its open inlet end spaced above said vessel aperture in substantial axial alignment therewith and with said enclosure opening;
    (d) an annular skirt concentrically spaced from said hood and telescopically movable with respect to the inlet end thereof from a position abutting the upper end of said vessel to a position vertically spaced therefrom; and
    (e) means for sealing the space between said skirt and said enclosure opening including:
        (i) a fixed annular ring attached about said enclosure opening and having downwardly extending plate means defining a pair of concentric open-ended spaces therebetween;
        (ii) a movable annular ring including a pair of receptacle-defining concentric plates extending upwardly each into one of said spaces in said fixed ring;
        (iii) means for supplying seal liquid into said receptacle; and
        (iv) means for moving said movable ring with respect to said fixed ring coincident with movement of said skirt.

11. Apparatus as recited in claim 10 in which said movable ring is fixedly attached to said skirt.

12. Apparatus as recited in claim 10 including means for supplying air under pressure to the radially innermost of said concentric spaces.

13. Apparatus as recited in claim 12 in which said fixed ring includes an annular closure plate closing the upper end of said spaces, said closure plate containing a through-opening communicating with the radially innermost of said concentric spaces, and air supply means communicating with said through-opening.

14. Appartus as recited in claim 13 in which said closure plate includes a plurality of circumferentially spaced through-openings and air supply means communicating with each of said through-openings.

15. Apparatus as recited in claim 10 including liquid seal means sealing the interstice between said skirt and said hood and means connecting said liquid seal means in liquid circulation with said receptacle in said movable ring.

16. Apparatus as recited in claim 10 in which said movable ring comprises:
   (a) means forming an annular plenum at the lower end thereof; and
   (b) means for circulating cooling fluid through said plenum.

17. Apparatus as recited in claim 16 including:
   (a) a partition plate in said plenum;
   (b) cooling fluid supply means communicating with said plenum on one side of said partition plate; and
   (c) cooling fluid discharge means communicating with said plenum on the other side of said partition plate.

18. Apparatus as recited in claim 11 including:
   (a) a hood having a detachable portion overlying said enclosure opening;
   (b) means for moving said detachable hood portion laterally of said enclosure opening;
   (c) said movable ring being adapted with said skirt in its raised position to lift said fixed ring when the same is detached from said enclosure opening for lateral transport with said detachable hood portion.

19. Apparatus as recited in claim 15 in which said liquid seal means comprises an annular liquid-containing trough movable with said skirt and said movable ring, and including:
   (a) duct means interconnecting said trough and said receptacle for transfer of liquid, said duct means connecting with said trough at an elevation higher than that required to maintain the liquid level in said receptacle by gravity feed; and
   (b) means associated with said movable ring for discharge of seal liquid from said receptacle.

20. Apparatus as recited in claim 19 in which said seal liquid discharge means comprises:
   (a) a drain;
   (b) a tray attached to said movable ring for receiving liquid from said receptacle and for discharging the same to said drain; and
   (c) means enclosing said tray and said drain to prevent the egress of effluent gas.

* * * * *